(12) United States Patent
Toyama et al.

(10) Patent No.: US 12,009,700 B2
(45) Date of Patent: Jun. 11, 2024

(54) ROTOR

(71) Applicant: AISIN CORPORATION, Aichi (JP)

(72) Inventors: Shumpei Toyama, Kariya (JP); Yosuke Kimura, Kariya (JP); Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 227 days.

(21) Appl. No.: 17/637,343

(22) PCT Filed: Mar. 26, 2021

(86) PCT No.: PCT/JP2021/013031
§ 371 (c)(1),
(2) Date: Feb. 22, 2022

(87) PCT Pub. No.: WO2021/200708
PCT Pub. Date: Oct. 7, 2021

(65) Prior Publication Data
US 2022/0302781 A1    Sep. 22, 2022

(30) Foreign Application Priority Data

Mar. 31, 2020  (JP) ................................. 2020-062100

(51) Int. Cl.
*H02K 1/28* (2006.01)
*H02K 5/15* (2006.01)

(52) U.S. Cl.
CPC ................ *H02K 1/28* (2013.01); *H02K 5/15* (2013.01); *H02K 2213/03* (2013.01)

(58) Field of Classification Search
CPC ........ H02K 1/28; H02K 5/15; H02K 2213/03; H02K 1/32
See application file for complete search history.

(56) References Cited

U.S. PATENT DOCUMENTS

2019/0115812 A1* 4/2019 Kinpara ................. H02K 11/21

FOREIGN PATENT DOCUMENTS

| CN | 203 272 207 U | 11/2013 |
| JP | 2003-042133 A | 2/2003 |

(Continued)

OTHER PUBLICATIONS

Oct. 10, 2022 Extended Search Report issued in European Patent Application No. 21780805.4.

(Continued)

*Primary Examiner* — Thomas Truong
(74) *Attorney, Agent, or Firm* — Oliff PLC

(57) ABSTRACT

A rotor for rotary electric machine includes shaft that includes flange portion, rotor core that fits to shaft wherein manner that rotational torque can be transmitted between rotor core and shaft, first end plate that covers one end face of rotor core in axial direction, second end plate that covers another end face of rotor core in axial direction, nut member that is screwed to shaft and holds rotor core with flange portion in axial direction, first washer provided between flange portion and first end plate in axial direction, and second washer provided between nut member and second end plate in axial direction. Flange portion protrudes to outer radial side from outer peripheral surface of shaft to which rotor core is fitted. First washer is in contact with seat surface of flange portion in axial direction, and has outer diameter larger than outer diameter of seat surface of flange portion.

16 Claims, 5 Drawing Sheets

(56) References Cited

FOREIGN PATENT DOCUMENTS

| | | |
|---|---|---|
| JP | 2015-100227 A | 5/2015 |
| JP | 2016-096635 A | 5/2016 |
| JP | 2018-157669 A | 10/2018 |
| WO | 2012/169043 A1 | 12/2012 |
| WO | 2018/030370 A1 | 2/2018 |

OTHER PUBLICATIONS

May 25, 2021 International Search Report issued in International Patent Application No. PCT/JP2021/013031.

* cited by examiner

ROTOR

TECHNICAL FIELD

The present disclosure relates to a rotor.

BACKGROUND ART

A technique of holding a rotor core between a nut member and a flange portion due to an axial force caused by tightening of the nut member by bringing the rotor core to be in contact with, in an axial direction, the flange portion (receiving portion) on one side of an axial direction of a shaft and tightening the nut member on the shaft from the other side of the axial direction is known.

RELATED ART DOCUMENTS

Patent Documents

Patent Document: Japanese Unexamined Patent Application Publication No. 2015-100227 (JP 2015-100227 A)

SUMMARY OF THE DISCLOSURE

Problem to be Solved by the Disclosure

However, in the above technique, stress due to the axial force is likely to occur in a contact portion of the rotor core with the flange portion.

Therefore, an object of the present disclosure is to reduce the stress that may occur in the rotor core due to the axial force caused by tightening of the nut member.

Means for Solving the Problem

According to one aspect of the present disclosure, a rotor for a rotary electric machine is provided so as to include
  a shaft that includes a flange portion that protrudes to an outer radial side on one end in an axial direction,
  a rotor core that fits to the shaft in such a manner that rotational torque can be transmitted between the rotor core and the shaft,
  a first end plate that covers one end face of the rotor core in the axial direction,
  a second end plate that covers another end face of the rotor core in the axial direction,
  a nut member that is screwed to the shaft and that holds the rotor core with the flange portion in the axial direction,
  a first washer provided between the flange portion and the first end plate in the axial direction, and
  a second washer provided between the nut member and the second end plate in the axial direction.
The flange portion protrudes to the outer radial side from an outer peripheral surface of the shaft to which the rotor core is fitted, and
  the first washer is in contact with a seat surface of the flange portion in the axial direction, and has an outer diameter larger than an outer diameter of the seat surface of the flange portion.

Effects of the Disclosure

According to the present disclosure, it is possible to reduce the stress that may occur in the rotor core due to the axial force caused by tightening of the nut member.

MODES FOR CARRYING OUT THE DISCLOSURE

Hereinafter, each embodiment will be described in detail with reference to the accompanying drawings.

Figure 1:
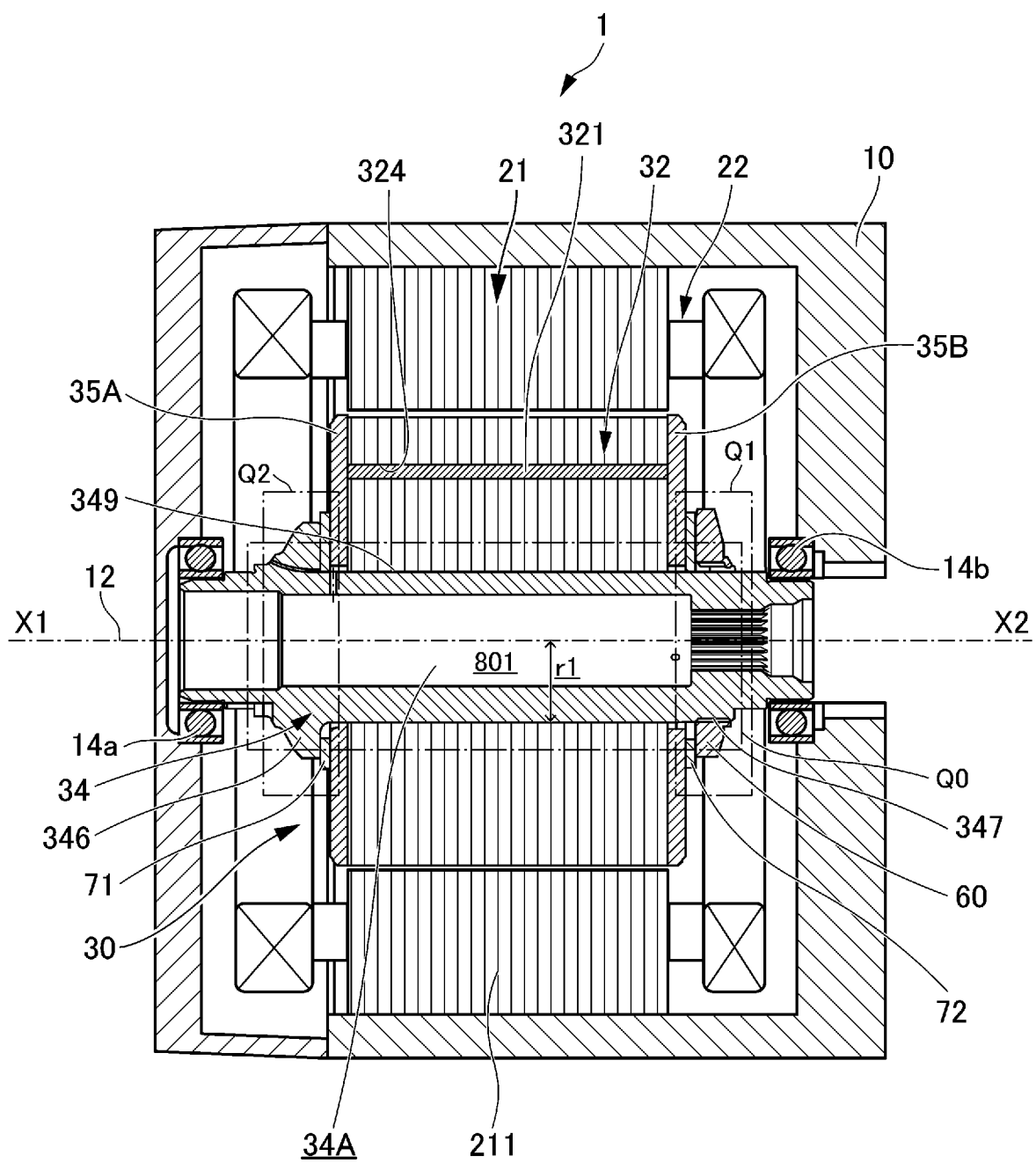
FIG. 1 is a cross-sectional view schematically showing a cross-sectional structure of a motor according to an embodiment.
Figure 1A:
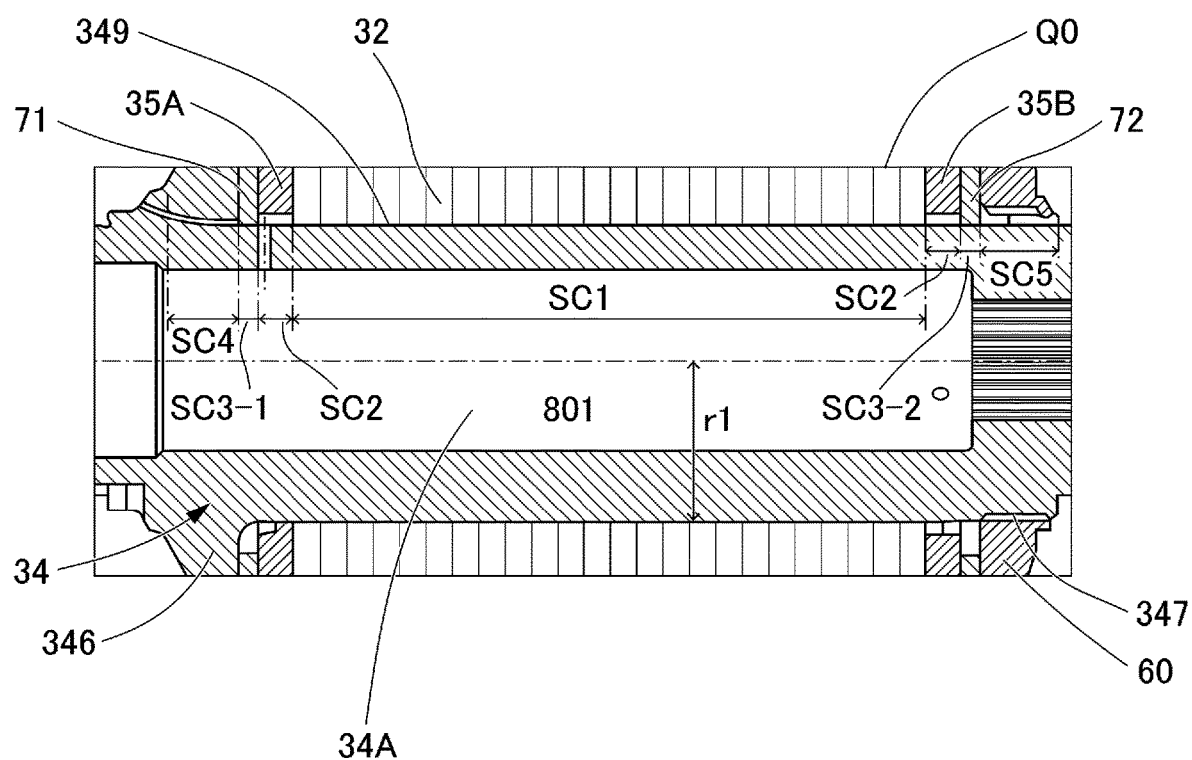
FIG. 1A is an enlarged view of a Q0 portion of FIG. 1.
Figure 2:
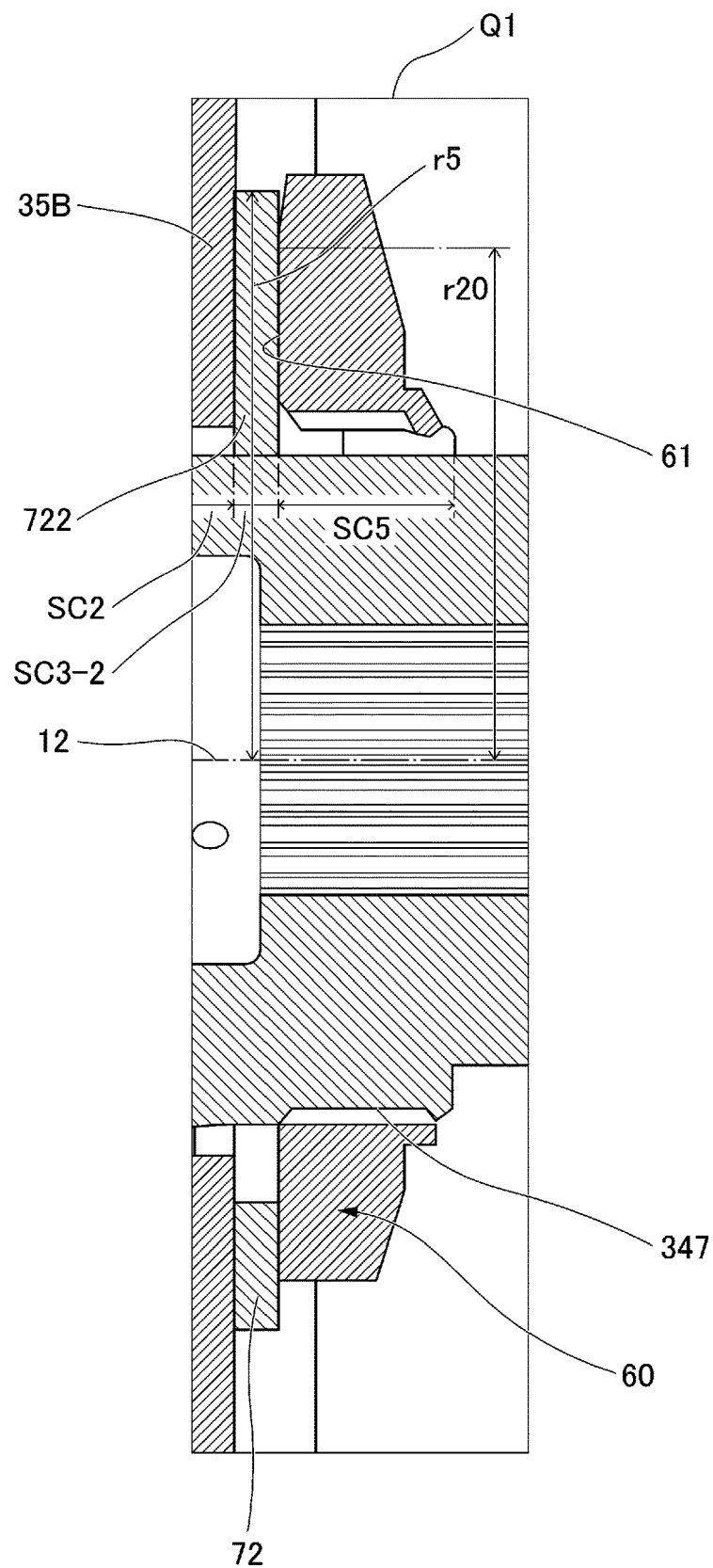
FIG. 2 is an enlarged view of a Q1 portion of FIG. 1.
Figure 3:
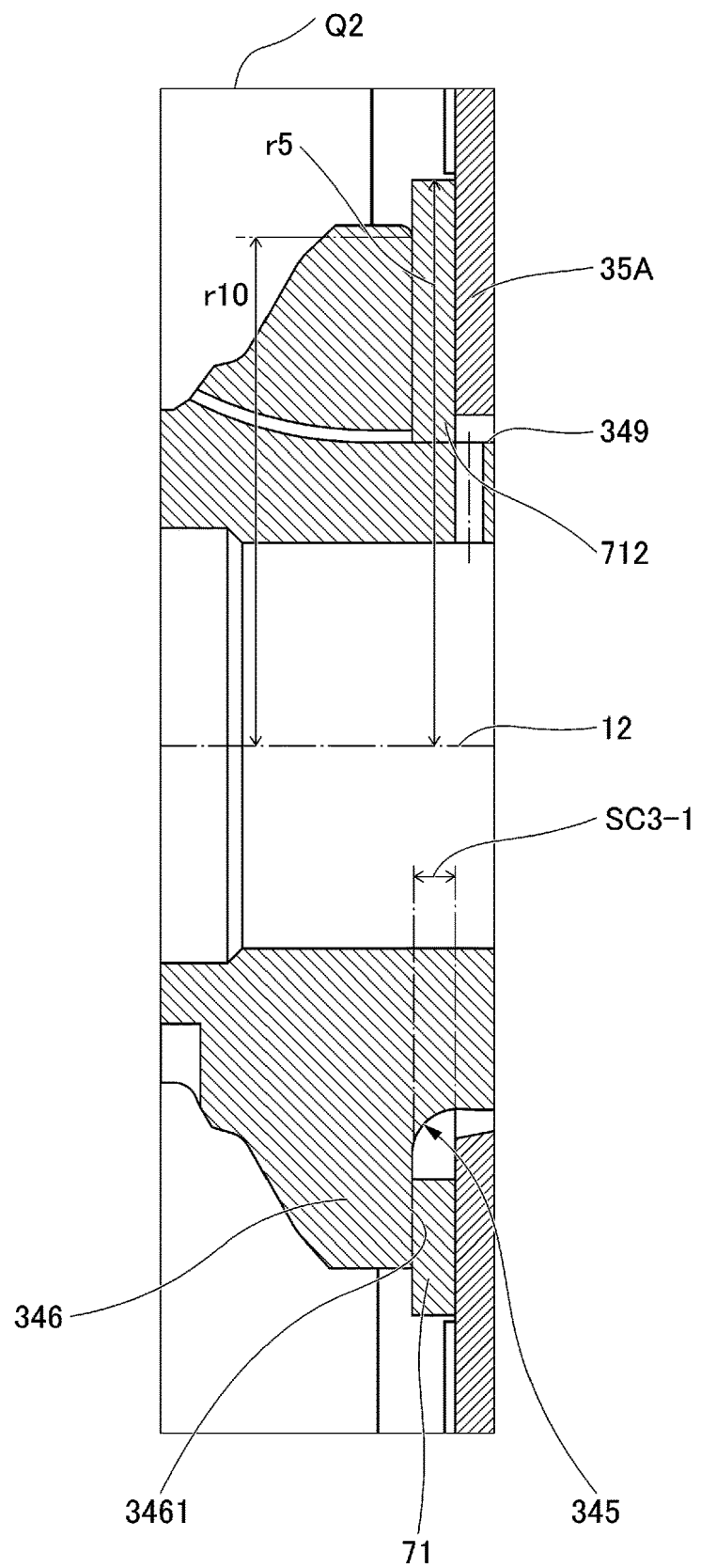
FIG. 3 is an enlarged view of a Q2 portion of FIG. 1.
Figure 4:
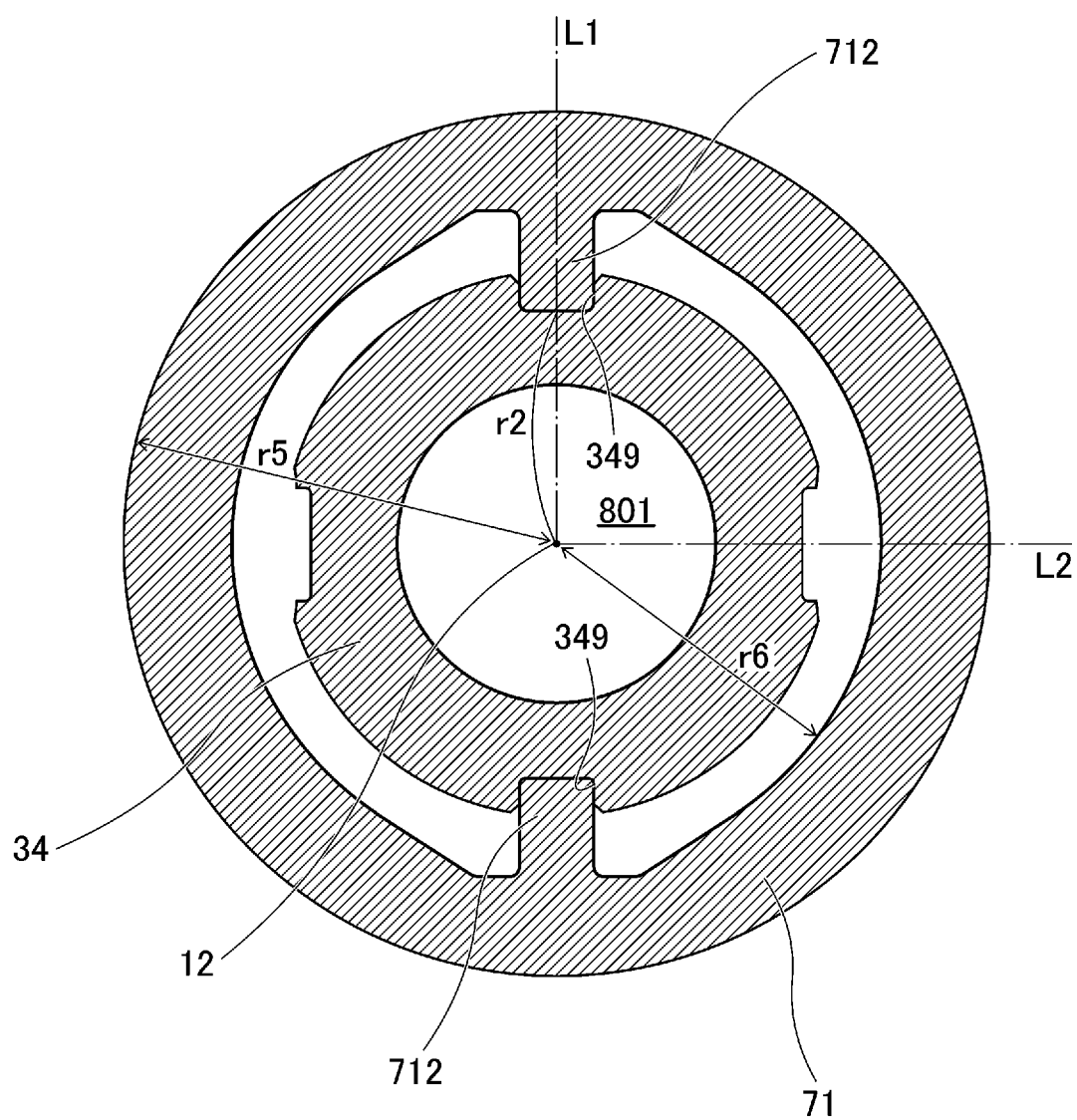
FIG. 4 is a cross-sectional view through a rotor shaft and a first washer, and is a cross-sectional view taken along a plane perpendicular to a rotation axis of the motor.

FIG. 1 is a cross-sectional view schematically showing a cross-sectional structure of a motor 1 (an example of a rotary electric machine) according to an embodiment. FIG. 1A is an enlarged view of a Q0 portion of FIG. 1. FIG. 2 is an enlarged view of a Q1 portion of FIG. 1. FIG. 3 is an enlarged view of a Q2 portion of FIG. 1. FIG. 4 is a cross-sectional view through a rotor shaft 34 and a first washer 71, and is a cross-sectional view taken along a plane perpendicular to a rotation axis 12 of the motor 1. Note that FIG. 1 is a cross-sectional view of a plane passing through the rotation axis 12 of the motor 1 and taken along two planes along lines L1 and L2 of FIG. 4.

FIG. 1 shows the rotation axis 12 of the motor 1. In the following description, an axial direction refers to a direction in which the rotation axis (rotation center) 12 of the motor 1 extends, and a radial direction refers to a radial direction centered on the rotation axis 12. Therefore, an outer radial side refers to a side away from the rotation axis 12, and an inner radial side refers to a side toward the rotation axis 12. Further, a circumferential direction corresponds to a rotation direction around the rotation axis 12.

Further, in FIG. 1, an X1 side and an X2 side along the direction of the rotation axis 12 (that is, the axial direction) are defined. An X direction is parallel to the axial direction. In the following description, the terms X1 side and X2 side may be used to describe the relative positional relationship.

The motor 1 may be a vehicle driving motor used in, for example, a hybrid vehicle or an electric vehicle. However, the motor 1 may be used for any other purpose.

The motor 1 is an inner rotor type, and a stator 21 is provided so as to surround the outer radial side of a rotor 30. The outer radial side of the stator 21 is fixed to a motor housing 10. The stator 21 includes, for example, a stator core 211 made of a magnetic laminated steel plate having an annular shape, and a plurality of slots (not shown) around which a coil 22 is wound is provided on the inner radial side of the stator core 211.

The rotor 30 is disposed on the inner radial side of the stator 21. The rotor 30 includes a rotor core 32 and a rotor shaft 34. The rotor core 32 is fixed to the surface on the outer radial side of the rotor shaft 34 in such a manner that rotational torque can be transmitted, and rotates together with the rotor shaft 34. The rotor core 32 may be fixed (fitted) to the rotor shaft 34 by shrink fitting, press fitting, or the like. In FIG. 1, the rotor core 32 faces, in the radial direction, the surface on the outer radial side (outer peripheral surface) of the rotor shaft 34 in an axial range SC1 (see FIG. 1A). The rotor shaft 34 is rotatably supported by the motor housing 10 via bearings 14a and 14b. The rotor shaft 34 defines the rotation axis 12 of the motor 1.

The rotor core 32 is made of, for example, a magnetic laminated steel plate having an annular shape. A permanent magnet 321 is embedded in a magnet hole 324 of the rotor core 32. Alternatively, a permanent magnet such as the permanent magnet 321 may be embedded in the outer peripheral surface of the rotor core 32. The permanent magnet 321 may be arranged as appropriate.

End plates 35A and 35B are attached to opposite sides of the rotor core 32 in the axial direction. The end plates 35A and 35B cover the axial end faces of the rotor core 32. The end plates 35A and 35B may have a detachment prevention function for preventing the permanent magnet 321 from detaching from the rotor core 32 and a function for adjusting imbalance of the rotor 30 (function for eliminating the imbalance by cutting or the like). In FIG. 1, each of the end plates 35A and 35B faces, in the radial direction, the surface on the outer radial side of the rotor shaft 34 in an axial range SC2 (see FIG. 1A). The axial range SC2 is set on both sides (both sides in the axial direction) of the axial range SC1 described above.

The end plates 35A and 35B are each made of a non-magnetic material. The end plates 35A and 35B are each preferably made of aluminum. In this case, cutting is easily performed, and the function for adjusting the imbalance of the rotor 30 using the end plates 35A and 35B can be effectively realized. However, in a modification, the end plates 35A and 35B may be made of stainless steel or the like.

As shown in FIG. 1, the rotor shaft 34 has a hollow portion 34A. The hollow portion 34A extends over the entire axial length of the rotor shaft 34. The hollow portion 34A may open on both axial sides in the axial direction. The hollow portion 34A extends over the entire axial length of the rotor shaft 34. The hollow portion 34A may function as an oil passage 801 through which cooling oil passes.

As shown in FIG. 1, the rotor shaft 34 is provided with a nut member 60.

The nut member 60 has, for example, a hexagonal outer shape when viewed from the axial direction, and a female screw portion is formed on the inner radial side thereof. At the time of assembly, after the rotor core 32 is assembled to the rotor shaft 34, the nut member 60 is screwed to the male screw portion formed on the surface on the outer radial side of the rotor shaft 34 and tightened in the axial direction. As a result, the rotor core 32 is held between a flange portion 346 of the rotor shaft 34 and the nut member 60 of the rotor shaft 34 in the axial direction. In this case, an axial force in the axial direction is applied to the rotor core 32 by tightening of the nut member 60.

As shown in FIG. 2, a seat surface 61 of the nut member 60 is a seat surface in contact with a second washer 72 described below. That is, the seat surface 61 of the nut member 60 contacts the second washer 72 in such a manner that the second washer 72 is in surface contact with the seat surface 61. The seat surface 61 of the nut member 60 extends in a constant plane perpendicular to the axial direction. The seat surface 61 of the nut member 60 is in the form of an annular shape when viewed from the axial direction, and has the outer diameter r20.

As described above, according to the present embodiment, the rotor core 32 can be held between the nut member 60 and the flange portion 346 by the axial force caused by tightening of the nut member 60 by bringing the rotor core 32 to be in contact with, in the axial direction, the flange portion 346 (receiving portion) on the X1 side of the axial direction of the rotor shaft 34 and tightening the nut member 60 on the rotor shaft 34 from the X2 side of the axial direction.

In the present embodiment, a configuration of a magnetic pole of the rotor core 32 is determined as appropriate. For example, the number of magnetic poles may be eight poles or other than eight poles, and instead of or in addition to the permanent magnet 321, a pair of permanent magnets constituting each magnetic pole may be disposed in such a manner that a circumferential distance thereof increases toward the outer radial side. Further, the rotor core 32 may be provided with a flux barrier, an oil passage, or the like.

Further, in the present embodiment, the rotor shaft 34 has a hollow portion 34A, but may be solid. Further, the rotor shaft 34 may be formed by connecting two or more parts. Further, the motor 1 may be cooled by cooling water (for example, lifelong coolant) instead of or in addition to oil.

Next, the rotor 30 according to the present embodiment will be described in more detail with reference to FIGS. 1 to 4. In the following description, the term "inner axial side" refers to a side relatively close to the center of the rotor core 32 in the axial direction along the rotation axis 12, and the term "outer axial side" refers to a side relatively far from the center of the rotor core 32 in the axial direction along the rotation axis 12.

The rotor shaft 34 includes the flange portion 346 protruding to the outer radial side on one end in the axial direction (X1 side in the axial direction). The flange portion 346 protrudes to the outer radial side from the outer peripheral surface of the rotor shaft 34 to which the rotor core 32 is fitted. In FIG. 1, the rotor shaft 34 includes the flange portion 346 over an axial range SC4 (see FIG. 1A). The axial range SC4 on which the flange portion 346 is provided is adjacent to an axial range SC3-1 of the surface on the outer radial side of the rotor shaft 34 from the outer axial side. The axial range SC3-1 (see FIG. 1A) is described below.

The flange portion 346 has a flange shape around the rotation axis 12, and includes a seat surface 3461 (see FIG. 3) on the inner axial side. The flange portion 346 has a function of receiving the axial force that occurs by tightening of the nut member 60 described below. The seat surface 3461 is a seat surface in contact with a first washer 71 described below. That is, the seat surface 3461 of the flange portion 346 contacts the first washer 71 described below in such a manner that the first washer 71 is in surface contact with the seat surface 3461. The seat surface 3461 extends in a constant plane perpendicular to the axial direction. The seat surface 3461 is in the form of an annular shape when viewed from the axial direction, and has the outer diameter r10.

The rotor shaft 34 is provided with a corner radius at a corner portion 345 adjacent to the seat surface 3461 of the flange portion 346 from the inner radial side. That is, the corner radius is applied to the corner portion 345 of the rotor shaft 34 at which the flange portion 346 protrudes to the outer radial side from the outer peripheral surface of the rotor shaft 34 to which the rotor core 32 is fitted. The outer diameter of the outer peripheral surface of the rotor shaft 34 at which the corner radius starts may be the same as the outer diameter of the outer peripheral surface of the rotor shaft 34 to which the rotor core 32 is fitted (that is, the outer diameter of the axial range SC1). The corner radius may be provided over the entire circumference of the corner portion 345 around the rotation axis 12 other than a range in which a groove portion 349 described below is provided. The size (that is, the radius) of the corner radius is preferably large from the viewpoint of reducing the stress that occurs in the flange portion 346. On the other hand, as the size of the corner radius increases, the boundary position on the inner radial side of the seat surface 3461 moves to the outer radial side, and the axial length of the axial range SC3-1 tends to increase. When the boundary position on the inner radial side of the seat surface 3461 is located on the outer radial side, the axial force cannot be directly applied to the rotor core 32 on the inner radial side. Further, the longer the axial length of the range SC3-1 is, the longer the axial length of the rotor 30 is. Therefore, the thickness (that is, the radius) of the corner radius in the axial direction may be preferably about the plate thickness of the first washer 71 such that an inconvenience described above is not caused, for example, is significantly smaller than a sum of the plate thickness of the first washer 71 and the plate thickness of the end plate 35A, and is preferably equal to or smaller than the thickness of the first washer 71. As a result, the rotor core 32 in the axial direction can be positioned by the first washer 71 while reducing the stress that occurs in the flange portion 346 and the axial length of the axial range SC3-1.

The rotor shaft 34 includes a nut engaging portion 347 on the other end in the axial direction (X2 side in the axial direction). In FIG. 1, the rotor shaft 34 includes the nut engaging portion 347 over an axial range SC5. The axial range SC5 on which the nut engaging portion 347 is provided is adjacent to an axial range SC3-2 of the surface on the outer radial side of the rotor shaft 34 from the outer axial side. The axial range SC3-2 is described below. A part of the nut engaging portion 347 may be provided in a part of the axial range SC3-2 (a part adjacent to the axial range SC5).

The nut engaging portion 347 is in the form of a male screw portion around the rotation axis 12. The nut member 60 is screwed (screw-tightened) to the nut engaging portion 347.

The outer diameter of the rotor shaft 34 is equal to or less that the outer diameter r1 (see FIG. 1) in the axial range SC1 in a section from the other end in the axial direction (X2 side in the axial direction) to the position of the flange portion 346 in the axial direction. Therefore, the rotor core 32 (and the end plates 35A, 35B, etc.) can be assembled to the rotor shaft 34 from the other end in the axial direction.

The rotor shaft 34 includes the groove portion 349 having a recess shape and extending in the axial direction on the surface on the outer radial side. The groove portion 349 is in the form of a so-called key groove for key coupling, and may be provided at two or more locations (two locations in FIG. 4) at different peripheral positions in the circumferential direction. The outer diameter r2 in the groove portion 349 (that is, the outer diameter of the bottom surface of the groove portion 349 as shown in FIG. 4) is smaller than the outer diameter r1 by the depth thereof. In each of the groove portions 349, a protruding portion 712 and a protruding portion 722 of the respective first washer 71 and the second washer 72 described below are fitted (see FIG. 4 for the protruding portion 712). The groove portion 349 may be provided on the surface portion having the outer diameter r2 or larger of the surface on the outer radial side of the rotor shaft 34 in the section from the end portion on the X2 side in the axial direction to the flange portion 346. The groove portion 349 may be formed by rolling, cutting, or the like, or may be formed by a mold shape at the time of casting.

In the present embodiment, the rotor 30 further includes the first washer 71 and the second washer 72. Both the first washer 71 and the second washer 72 have annular shapes when viewed from the axial direction. Both the first washer 71 and the second washer 72 may be formed of iron, a non-magnetic material, or the like.

The first washer 71 is provided between the flange portion 346 and the rotor core 32 in the axial direction. The first washer 71 faces, in the radial direction, the surface on the outer radial side of the rotor shaft 34 (outer peripheral surface) in the axial range SC3-1. The first washer 71 engages with the surface on the outer radial side of the rotor shaft 34, as shown in FIG. 4. Specifically, the first washer 71 includes the protruding portion 712 protruding to the inner radial side, and the protruding portion 712 is fitted in the groove portion 349 of the rotor shaft 34. The protruding portion 712 is fitted in the groove portion 349, so that the first washer 71 is positioned in the radial direction with respect to the rotor shaft 34. Hereinafter, the function of such a protruding portion 712 described above is also referred to as a "positioning function in the radial direction".

The first washer 71 has a function of reducing the stress that may occur on the end plate 35A and the rotor core 32 due to the axial force applied to the end plate 35A (and the rotor core 32 via the end plate 35A) from the flange portion 346 (hereinafter also referred to as a "stress reducing function").

Specifically, as described above, the rotor core 32 is held between the flange portion 346 and the nut member 60, and the axial force acts by tightening of the nut member 60. That is, an axial compressive force of a magnitude corresponding to the magnitude of the axial force acts on the rotor core 32 between the flange portion 346 and the nut member 60. Such an axial force is useful for reliably holding the rotor core 32 between the flange portion 346 and the nut member 60, but can be a factor for causing the stress in the rotor core 32 (and end plates 35A, 35B).

In this respect, according to the present embodiment, since the first washer 71 is interposed between the flange portion 346 and the rotor core 32, the stress that occurs in the end plate 35A and the rotor core 32 can be reduced as compared with a case where such a first washer 71 is not interposed.

The first washer 71 preferably has the outer diameter r5 that is significantly larger than the outer diameter r10 (see FIG. 3) of the seat surface 3461 of the flange portion 346 such that the stress reducing function described above is effectively realized. In this case, the surface pressure due to the axial force applied to the rotor core 32 can be reduced as compared with the case where the first washer 71 is not interposed. That is, a range in which the rotor core 32 receives the surface pressure can be dispersed to the outer radial side of the first washer 71 having the outer diameter r5. As a result, the stress that occurs in the end plate 35A and the rotor core 32 due to the axial force can be reduced.

Further, the first washer 71 preferably has the inner diameter r6 (see FIG. 4) so as not to come into contact with the surface on the outer radial side of the rotor shaft 34 in the radial direction at a portion other than the protruding portion 712. That is, the inner diameter r6 of the first washer 71 is preferably set such that the first washer 71 does not contact the corner radius of the corner portion 345 described above. As a result, the positioning function in the radial direction by the protruding portion 712 of the first washer 71 described above can be effectively realized.

The second washer 72 preferably has the same form as the first washer 71. In this case, parts can be commonized and costs can be reduced. In the present embodiment, as an example, the second washer 72 has the same form as the first washer 71. However, in a modification, the second washer 72 may have a different form from the first washer 71.

The second washer 72 is provided between the nut member 60 and the rotor core 32 in the axial direction. The second washer 72 faces, in the radial direction, the surface on the outer radial side (outer peripheral surface) of the rotor shaft 34 in the axial range SC3-2. The second washer 72 engages with the surface on the outer radial side of the rotor shaft 34. Specifically, the second washer 72 includes a protruding portion 722 protruding to the inner radial side, on the inner radial side, as in the first washer 71, and the protruding portion 722 is fitted in the groove portion 349 of the rotor shaft 34.

The second washer 72 has a function of reducing the stress that may occur in the end plate 35B and the rotor core 32 due to the axial force applied to the end plate 35B (and the rotor core 32 via the end plate 35B) from the nut member 60 (hereinafter also referred to as the "stress reducing function"). That is, the second washer 72 has the same stress reducing function as the first washer 71 described above.

As described above, according to the present embodiment, since the second washer 72 is interposed between the nut member 60 and the rotor core 32, the stress that occurs in the end plate 35B and the rotor core 32 can be reduced as compared with a case where such a second washer 72 is not interposed.

The second washer 72 preferably has the outer diameter r5 that is significantly larger than the outer diameter r10 (see FIG. 3) of the seat surface 61 of the nut member 60 such that the stress reducing function described above is effectively realized. In this case, the surface pressure due to the axial force applied to the rotor core 32 can be reduced as compared with the case where the second washer 72 is not interposed. That is, a range in which the rotor core 32 receives the surface pressure can be dispersed to the outer radial side of the second washer 72 having the outer diameter r5. As a result, the stress that occurs in the end plate 35B and the rotor core 32 due to the axial force can be reduced.

By the way, in the present embodiment, since the end plate 35A (an example of the first end plate) is provided between the rotor core 32 and the first washer 71, the function (detachment prevention function and the like for preventing the permanent magnet 321 from detaching from the rotor core 32 described above) by the end plate 35A is realized but inconvenience may occur in which the axial force also acts on the end plate 35A. This also applies to the end plate 35B (an example of the second end plate).

In particular, when the end plates 35A and 35B are each made of aluminum, relatively significant creep strain in aluminum can be a problem. That is, when the end plates 35A and 35B are each made of aluminum, the strain increases in the end plates 35A and 35B due to the axial force with the passage of time, and a decrease in the axial force may be a problem.

In this respect, according to the present embodiment, the stress reducing functions of the first washer 71 and the second washer 72 described above also function on the end plates 35A and 35B as described above. That is, by providing the first washer 71 and the second washer 72, the stress that occurs in the end plates 35A and 35B due to the axial force can be reduced. As a result, even when the end plates 35A and 35B are each made of aluminum, the inconvenience caused by the creep strain can be reduced.

Further, according to the present embodiment, as described above, since the rotor shaft 34 is provided with the corner radius on the corner portion 345 adjacent to the inner radial side (root portion) of the flange portion 346, stress concentration that is likely to occur at the corner portion 345 can be reduced.

Here, when the corner radius is applied to the corner portion 345, the stress concentration can be reduced as described above, but it becomes difficult to position the first washer 71 with respect to the rotor shaft 34 in the radial direction. This is because when the first washer 71 contacts the corner radius, the position in the radial direction is not determined. In this respect, according to the present embodiment, it is possible to easily position the first washer 71 in the radial direction with respect to the rotor shaft 34 by the relationship between the protruding portion 712 of the first washer 71 and the recessed groove portion 349 of the rotor shaft 34. As described above, according to the present embodiment, it is possible to easily position the first washer 71 in the radial direction with respect to the rotor shaft 34 while effectively reducing the stress that may occur in the corner portion 345 on the inner radial side of the flange portion 346.

Although each embodiment has been described in detail above, the present disclosure is not limited to the specific embodiments, and various modifications and changes can be made within the scope of the claims. Further, it is possible to combine all or a plurality of the configuration elements of the embodiments described above.

For example, in the above embodiment, the end plates 35A and 35B are provided, but one or both of the end plates 35A and 35B may be omitted.

Further, in the above embodiment, the rotor shaft 34 has a hollow portion, but may be a solid member.

DESCRIPTION OF THE REFERENCE NUMERALS

1 . . . motor (rotary electric machine), 34 . . . rotor shaft (shaft), 345 . . . corner portion, 346 . . . flange portion, 3461 . . . seat surface, 349 . . . groove portion, 32 . . . rotor core, 60 . . . nut member, 71 . . . first washer, 72 . . . second washer, 35A, 35B . . . end plate (first end plate, second end plate)

The invention claimed is:

1. A rotor for a rotary electric machine, the rotor comprising:
a shaft that includes a flange portion that protrudes to an outer radial side on one end in an axial direction;
a rotor core that fits to the shaft in such a manner that rotational torque can be transmitted between the rotor core and the shaft;
a first end plate that covers one end face of the rotor core in the axial direction;
a second end plate that covers another end face of the rotor core in the axial direction,
a nut member that is screwed to the shaft and that holds the rotor core with the flange portion in the axial direction;
a first washer provided between the flange portion and the first end plate in the axial direction; and
a second washer provided between the nut member and the second end plate in the axial direction, wherein
the flange portion protrudes to the outer radial side from an outer peripheral surface of the shaft to which the rotor core is fitted, and
the first washer is in contact with a seat surface of the flange portion in the axial direction, and has an outer diameter larger than an outer diameter of the seat surface of the flange portion.

2. The rotor according to claim 1, wherein the first end plate and the second end plate are each made of aluminum.

3. The rotor according to claim 2, wherein
a corner radius is applied to a corner portion of the shaft at which the flange portion protrudes to the outer radial side from the outer peripheral surface of the shaft to which the rotor core is fitted, and a thickness of the first washer is equal to or greater than a thickness of the corner radius in the axial direction.

4. The rotor according to claim 3, wherein the shaft includes a groove portion having a recess shape and extending in the axial direction on the outer peripheral surface of the shaft, and the first washer includes a protruding portion that is fitted in the groove portion on an inner radial side of the first washer.

5. The rotor according to claim 4, wherein the first washer and the second washer have the same form.

6. The rotor according to claim 3, wherein the first washer and the second washer have the same form.

7. The rotor according to claim 2, wherein the shaft includes a groove portion having a recess shape and extending in the axial direction on the outer peripheral surface of the shaft, and the first washer includes a protruding portion that is fitted in the groove portion on an inner radial side of the first washer.

8. The rotor according to claim 7, wherein the first washer and the second washer have the same form.

9. The rotor according to claim 2, wherein the first washer and the second washer have the same form.

10. The rotor according to claim 1, wherein a corner radius is applied to a corner portion of the shaft at which the flange portion protrudes to the outer radial side from the outer peripheral surface of the shaft to which the rotor core is fitted, and a thickness of the first washer is equal to or greater than a thickness of the corner radius in the axial direction.

11. The rotor according to claim 10, wherein the shaft includes a groove portion having a recess shape and extending in the axial direction on the outer peripheral surface of the shaft, and the first washer includes a protruding portion that is fitted in the groove portion on an inner radial side of the first washer.

12. The rotor according to claim 11, wherein the first washer and the second washer have the same form.

13. The rotor according to claim 10, wherein the first washer and the second washer have the same form.

14. The rotor according to claim 1, wherein the shaft includes a groove portion having a recess shape and extending in the axial direction on the outer peripheral surface of the shaft, and the first washer includes a protruding portion that is fitted in the groove portion on an inner radial side of the first washer.

15. The rotor according to claim 14, wherein the first washer and the second washer have the same form.

16. The rotor according to claim 1, wherein the first washer and the second washer have the same form.

* * * * *